United States Patent [19]

Hellriegel

[11] Patent Number: 4,860,496

[45] Date of Patent: * Aug. 29, 1989

[54] DOOR FOR A MOTOR VEHICLE

[75] Inventor: Edmund Hellriegel, Pulheim, Fed. Rep. of Germany

[73] Assignee: Dynamit Nobel Akiengesellschaft, Troisdorf, Fed. Rep. of Germany

[*] Notice: The portion of the term of this patent subsequent to Oct. 27, 2004 has been disclaimed.

[21] Appl. No.: 113,915

[22] Filed: Oct. 29, 1987

[30] Foreign Application Priority Data

Dec. 11, 1986 [DE] Fed. Rep. of Germany ....... 3642429

[51] Int. Cl.⁴ .............................................. B60J 5/04
[52] U.S. Cl. ................................................... 49/502
[58] Field of Search ......................... 49/502, 503, 501; 296/146, 37.13

[56] References Cited

U.S. PATENT DOCUMENTS

| | | | |
|---|---|---|---|
| 3,782,036 | 1/1974 | Clark et al. | 49/502 |
| 3,808,743 | 5/1974 | Renner et al. | 49/502 |
| 4,290,235 | 9/1981 | Jahnle et al. | 49/502 |
| 4,651,470 | 3/1987 | Imura et al. | 49/502 |
| 4,685,722 | 8/1987 | Srock | 296/146 X |
| 4,702,040 | 10/1987 | Hellriegel | 49/502 |

Primary Examiner—Philip C. Kannan
Attorney, Agent, or Firm—Antonelli, Terry & Wands

[57] ABSTRACT

A vehicle door having an outer wall and an inner wall spaced therefrom with at least the outer wall and/or the inner wall consisting at least extensively of a synthetic resin. A reinforcing member is completely embedded in the synthetic resin material, with the reinforcing member forming a closed frame corresponding to a contour of the vehicle door. An impact protection strut is provided which extends between at least one of the hinge support and door lock support and transmits forces acting laterally on the vehicle door to the vehicle body.

21 Claims, 5 Drawing Sheets

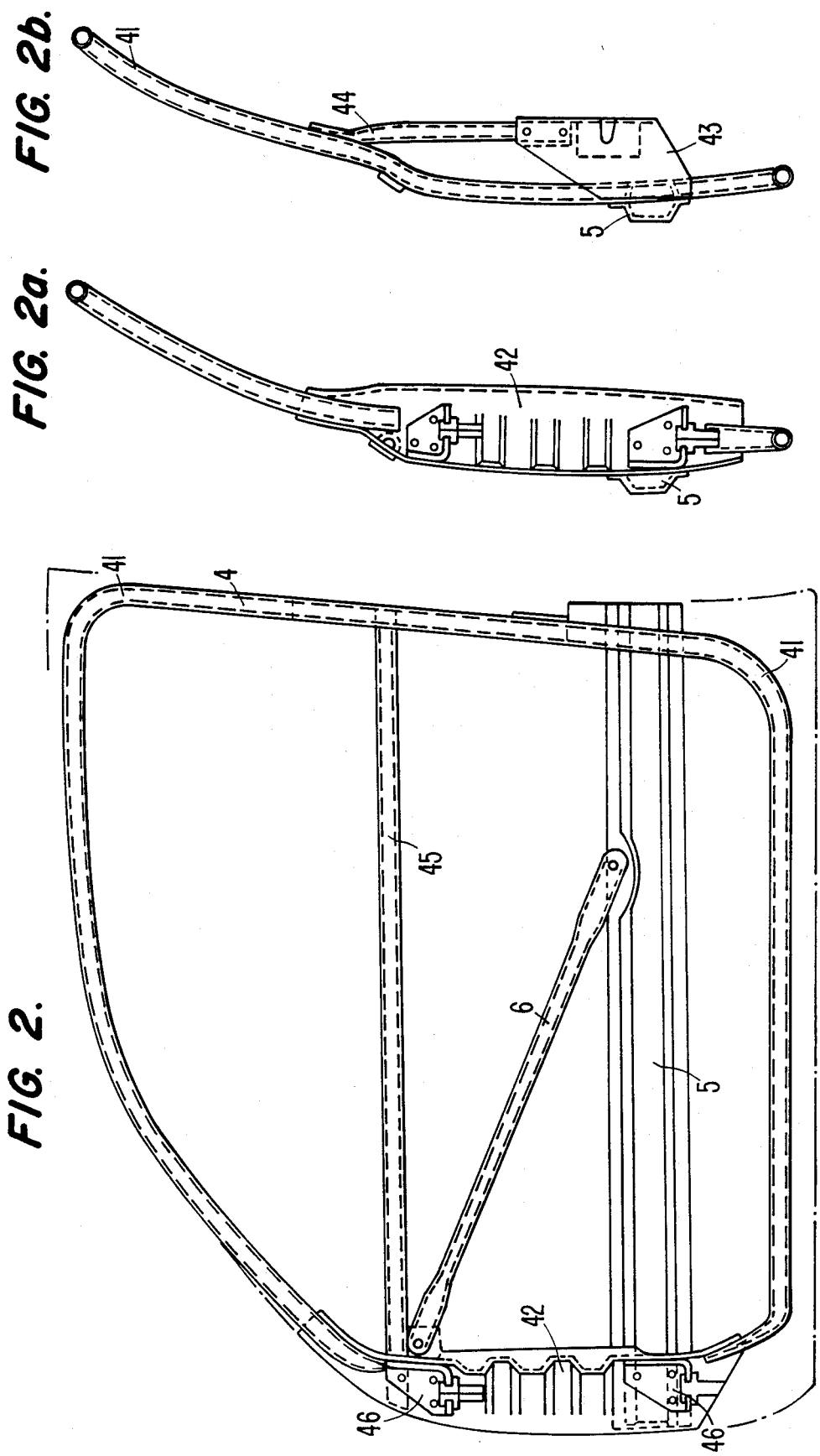

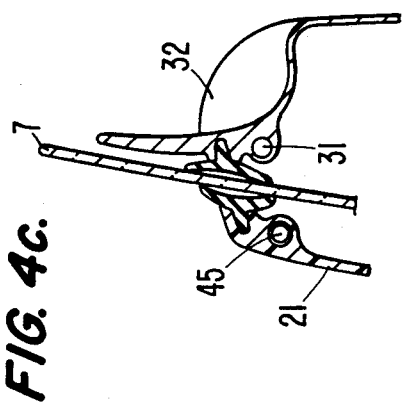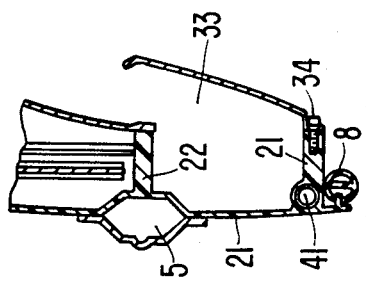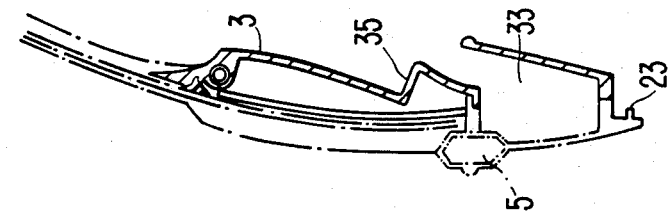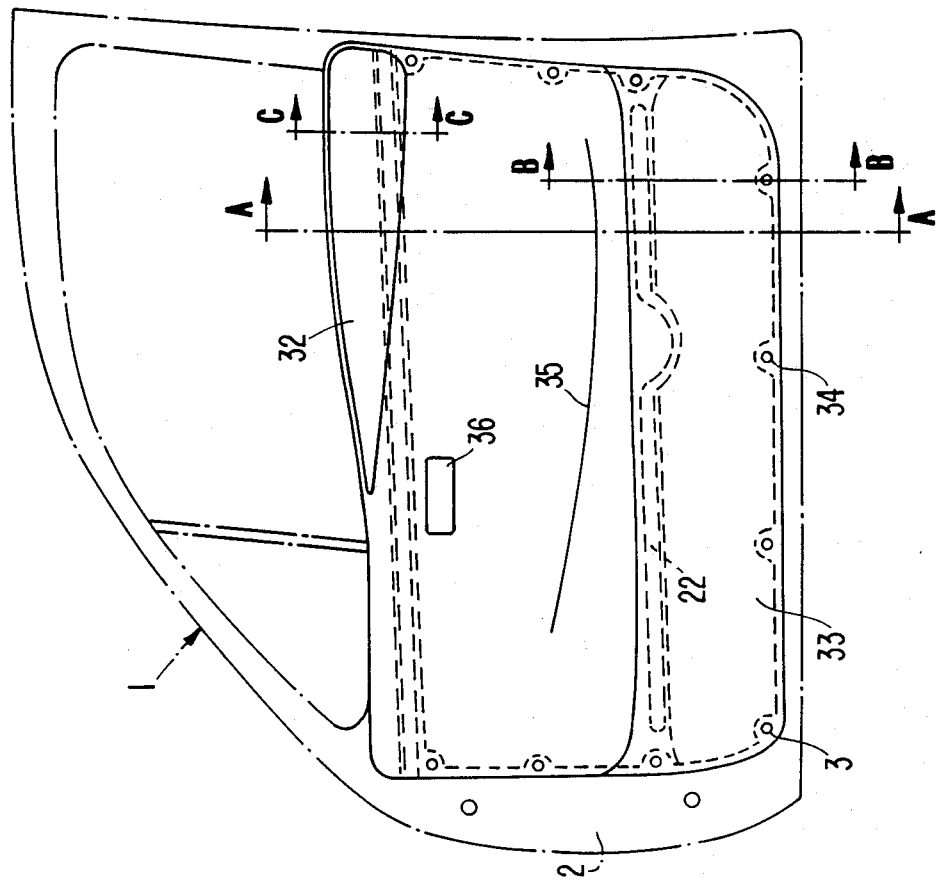

DOOR FOR A MOTOR VEHICLE

BACKGROUND OF THE INVENTION

This application relates to U.S application Ser. No. 873,358, now U.S. Pat. No. 4,702,040.

The present invention relates to a door and, more particularly, a door for a motor vehicle which includes an outer wall or skin and an inner wall or skin spaced from the outer wall or skin with at least one of the outer wall and inner wall being fashioned at least extensively of a synthetic resin, and with a rigidifying reinforcing member.

Conventional doors consisting either entirely or in part of a synthetic resin have been proposed in, for example, EP-OS 0,096,188 and corresponding U.S. Pat. No. 4,512,240, wherein the vehicle door comprises an outer wall and an inner wall arranged at a spacing with respect to the outer wall, and wherein at least one of the outer wall or the inner wall consists, at least for the greatest part, of a synthetic resin, as well as a rigidifying reinforcing member connected to at least one hinge or hinge support and to a door lock or door lock support. In the proposed construction, the outer wall and inner wall each are fashioned of a glass-fiber-reinforced synthetic resin.

Similar door structures are also proposed in German Pat. No. 3,104,681 and U.S. Pat. No. 4,328,642.

A disadvantage of the proposed motor vehicle doors resides in the fact that the mounting of the same is expensive. Furthermore, the rigidifying reinforcing member, generally made of a sheet steel, is subject to corrosion. Additionally, the conventional prior art doors, in spite of the high proportion of synthetic resin are relatively heavy weight and exhibit a low dimensional stability.

In, for example, not yet published Offenlegungsschrift 3,520,975 corresponding to EP-OS 0,204,996 and U.S. Ser. No. 061873,358, the reinforcing member forms a closed frame corresponding to the contour of the door, with the frame being embedded in the synthetic resin material of the inner wall and being enveloped by the synthetic resin material. The rigidifying reinforcing member is protected from corrosion and, the one-piece structure made up of the reinforcing member and inner wall permits a simple economical mounting of the vehicle door with a low overall total weight.

A disadvantage of this proposed vehicle door resides in the fact that it exhibits unsatisfactory behavior with respect to the deformation characteristics in situations involving a lateral stress, that is, the impact of another vehicle onto the outer wall of the door, since the skeleton or frame in the inner wall is capable of absorbing relatively high forces only upon a considerably extensive deformation.

The aim underlying the present invention essentially resides in providing a vehicle door, made extensively of a synthetic resin, wherein the vehicle door exhibits a high stiffness and ruggedness, can be manufactured in a simple and economical fashion, and exhibits a low shrinkage tendency due to temperature fluctuations, as well as being insensitive to corrosive effects.

In accordance with advantageous features of the present invention, the rigidifying reinforcing member forms a closed frame corresponding to a contour of the vehicle door. The frame is embedded in the synthetic resin material of one of the outer or inner walls and is enveloped thereby. An impact protection strut extends at least in part within the outer wall or is in contact therewith.

The significant feature of the present invention resides in the fact that the rigidifying reinforcing member, optionally with the exception of functional components such as the door lock and hinges, is enveloped by the synthetic resin material of the door of the motor vehicle. The rigidifying reinforcing member, forming an exterior frame, thereby determines extensively the dimensional stability of the door of the motor vehicle. Moreover, the reinforcing member prevents a shrinkage of the synthetic resin material during injection molding as well as a shrinkage due to temperature fluctuations and thereby ensures the dimensional stability of the vehicle door.

By virtue of the construction of the present invention, the rigidifying reinforcing member, which corresponds to the contour of the vehicle door and forms a closed frame, can be an integral component of the inner wall of the vehicle door and can also be integrated entirely or partially into the outer wall. Moreover, the outer and inner walls can be manufactured in one piece during a single production step.

In accordance with the features of the present invention, an impact protection strut or side beam extends between points of force application such as the hinge support and lock support or the hinge and the lock at or within the outer wall resulting in an effect such that, in case of a lateral action of a force onto the door of the motor vehicle, the forces are transmitted by way of the hinge or hinges and the lock to the vehicle body even upon a short deformation path of the outer wall. Thus, with a given deformation path, a high energy absorption of the vehicle door is provided and, consequently, the occupants of the vehicle are sufficiently protected.

The impact protection strut or side beam in accordance with the present invention extends, in a customary door construction, with laterally mounted hinges and a lock or lock support disposed in opposition thereto in an approximately horizontal direction.

Preferably, in accordance with the present invention, the impact protection strut is located within an outer wall of the vehicle door and is entirely surrounded by a synthetic resin material of the outer wall. By virtue of this arrangement, a reliable protection from corrosion is ensured without increasing the manufacturing expenses.

It is possible in accordance with the present invention, to integrate the rigidifying reinforcing member or skeleton, fashioned as a closed frame, into an outer wall of the vehicle door. In this arrangement the closed frame also encompasses the door window which, for example, may be constructed so as to be raisable and lowerable. Furthermore, additional struts may be provided for additional reinforcement particularly below the window of the vehicle door.

Preferably, in accordance with the present invention, all the rigidifying reinforcing members are completely enveloped by the synthetic resin material of the outer wall.

However, it is also possible in accordance with the present invention to embed the rigidifying reinforcing member or skeleton, which corresponds to the door contour and forms a closed frame, in the inner wall of the door of the motor vehicle and to attach the impact protection strut or side beam as a separate component by corresponding mounting elements to the hinge or hinge support and the lock or lock support in such a manner that the impact protection strut or side beam extends in parallel and at a spacing with respect to the inner wall while being in contact with the outer wall. In this arrangement, the impact protection strut is not necessarily surrounded by the synthetic resin material of the inner wall or the outer wall; however, it is still possible to lower a door window pane between the inner wall and the impact protection strut or side beam.

In accordance with still further features of the present invention, the impact protection strut is integrated into the outer wall and the rigidifying reinforcing member, which corresponds to the door contour and forms a closed frame, is embedded in the inner wall. In this arrangement, the outer wall preferably forms merely the outer contour of the door of the motor vehicle which lies below the opening of the window; whereas, the window boundary is formed on the inside as well as the outside by the inner wall. With this arrangement, the outer wall with the integrally joined impact protection strut or side beam is connected, during an assembly of the door of the motor vehicle, to the inner wall in such a manner that the impact protection strut is connected to at least one of the hinge or hinge support and to at least one of the door lock or door lock support of the inner wall.

In an arrangement where the rigidifying reinforcing member is embedded in the outer wall, the inner wall preferably is constructed so that a structure is provided that covers merely the interior of the door beneath the window opening; whereas, the outer wall constitutes, above the lower boundary of the window, the inner contour as well as the outer contour of the door.

The rigidifying reinforcing member and/or the impact protection strut or side beam is preferably formed of a metal such as, for example, steel, and the rigidifying reinforcing member is preferably produced in a welded construction from pipes and/or press molded parts. As can be appreciated, additional reinforcing struts can also be inserted in the one-piece outer wall and/or inner wall of the motor vehicle door by, for example, thread fasteners such as screws or the like.

In addition with still further features of the invention, the reinforcing member may include at least one outer tubular frame, a door lock support, as well as a head piece serving as the hinge support.

Advantageously, the head piece, according to the present invention, is fashioned as a profiled angle member and serves as an anchoring plate for the hinge system, the outer tubular frame, and the impact protection struts.

It is also possible, in accordance with the present invention, to provide an additional diagonal strut connected by way of connecting elements, e.g. screws, to the head piece and to the impact protection strut, with the impact protection strut being fashioned as an integral part of the outer wall.

The vehicle door of the present invention may include an outer wall which has, at a level of the impact protection strut or side beam, a web extending toward an interior of the vehicle, with the web defining a lower door space for a door storage compartment as contrasted to an upper door space. The door storage compartment may be defined toward the outside by the outer wall and toward the inside of the vehicle by the inner wall.

Advantageously, the outer wall is produced from a glass-fiber-reinforced polyurethane hardening in a manner of a thermal set by reinforced reaction injection molding (RRIM) with the reinforcing member as well as the impact protection strut being integrated as insert parts.

Additionally, the inner wall, in accordance with the present invention, can also be produced from glass-fiber-reinforced polyurethane hardening in a thermal set manner by reinforced reaction injection molding (RRIM) with a decorative surface paneling being inserted into the injection mold.

The rigidifying reinforcing member according to the present invention below the window opening of the door of the motor vehicle has an approximately horizontal restraining strut which is connected to the outer tubular frame in such a manner that the window opening is entirely encompassed thereby.

Furthermore, according to the present invention, the synthetic resin material of the outer wall or the inner wall surrounds the outer tubular frame and the restraining strut in a bead-like manner, with the beads forming, in an area of the boundary of the window, an outer contour as well as an inner contour of the door of the motor vehicle.

Furthermore, at least one of the outer wall or the inner wall of the door of the motor vehicle terminates at a lower boundary line of the opening of the window.

The above and other features and advantages of the present invention will become more apparent from the following description when taken in connection with the accompanying drawings which show, for the purpose of illustration only, one embodiment in accordance with the present invention.

BRIEF DESCRIPTION OF THE DRAWINGS

FIG. 2 is a plan view of a reinforcing member and a side beam of a vehicle door constructed in accordance with the present invention;

FIG. 2a is an end view of the vehicle door of FIG. 2;

FIG. 2b is a transverse detail view of the relationship of an outer tubular frame, skeleton expander, door lock support and impact protection strut of the vehicle door of FIG. 2;

FIG. 3d is a sectional view taken along the line A—A in FIG. 3a;

FIG. 4 is a plan view of an inner wall of a motor vehicle door constructed in accordance with the present invention;

FIG. 4a is a cross-sectional view taken along the line A—A in FIG. 4;

FIG. 4b is a partial cross-sectional view taken along the line B—B in FIG. 4;

FIG. 4c is a partial cross-sectional view taken along the line C—C in FIG. 4;

DETAILED DESCRIPTION

Figure 1B:
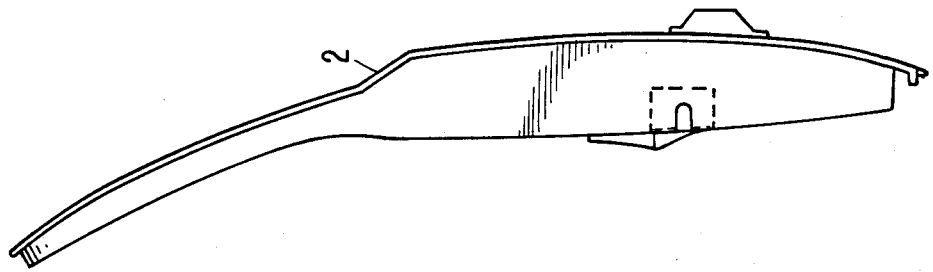
FIGS. 1a, 1b are respective end views of the vehicle door of FIG. 1.
Figure 1A:
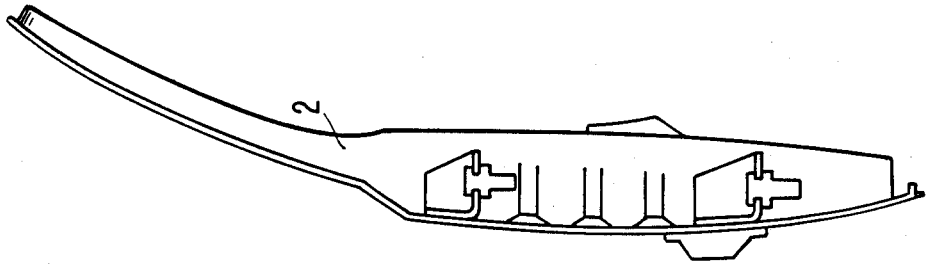
Figure 1:
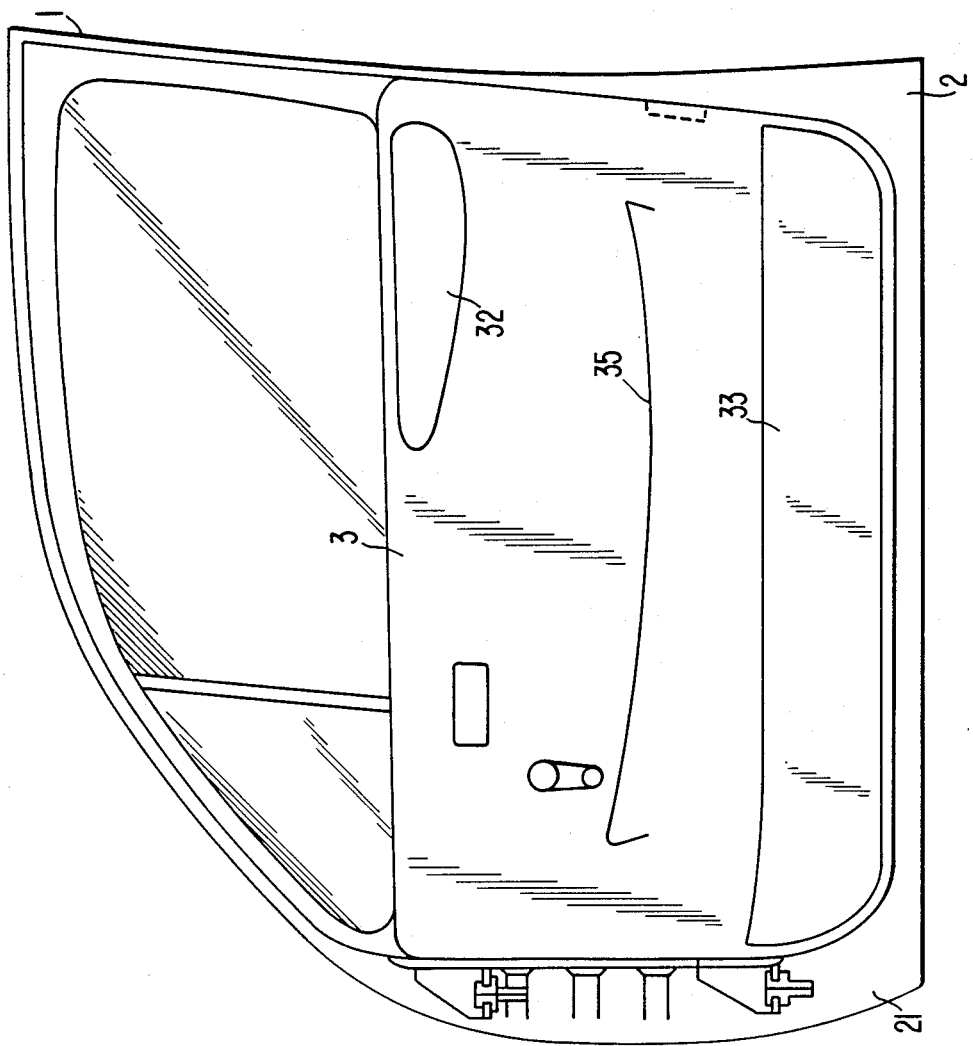
FIG. 1 is an elevational view of a door frame motor vehicle constructed in accordance with the present invention, as viewed from an interior of the vehicle.
Figure 3D:
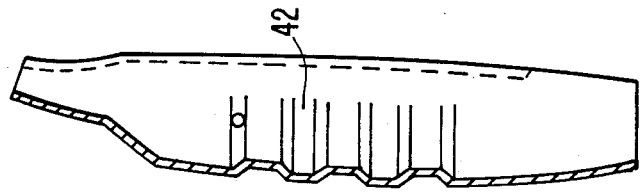
Figure 3C:
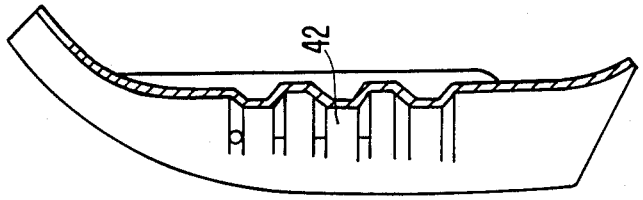
FIG. 3c is a sectional view taken along the line B—B in FIG. 3b.
Figure 3B:
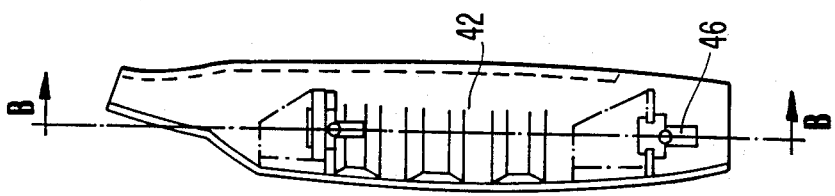
FIGS. 3a, 3b are plan views of a head piece or hinge support of a motor vehicle door constructed in accordance with the present invention.
Figure 3A:
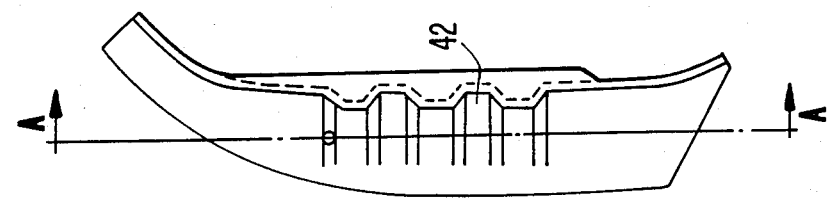

Referring now to the drawings wherein like reference numerals are used throughout the various views to designate like parts and, more particularly, to FIG. 1, according to this figure, a vehicle door 1 has a shell-like outer wall structure 2 for ensuring a high stiffness or rigidity. A rigidifying reinforcing member 4 as well as an impact protection strut (FIG. 2) connected therewith are embedded in the outer wall 2, that is, a synthetic resin material 21 of an outer wall 2 envelops the impact protection strut 5 as well as the reinforcing member 4 completely and, optionally, with the exception of the lock support 43 and hinge system 46.

In the illustration construction, the outer wall 2 is manufactured by a reinforced reaction injection molding process (RRIM) and, for this purpose, the skeleton or reinforcing member 4 and impact protection strut 5 connected therewith are inserted in an injection mold surrounded by molding with glass-fiber-reinforced polyurethane (PUR) which hardens by a thermal setting.

By constructing the outer wall 2 of the vehicle door as a skeleton-reinforced injection molded part it is possible to enable a free shaping of an external configuration of the door of the motor in order to meet desired design characteristics as well as aerodynamic requirements. It is also possible to integrate, in an economical fashion, complicated functional parts as well such as, for example, indentations for the door handle or continuously extending mounting lips for a door gasket etc.

The embedded skeleton or reinforcing member 4 imparts to the vehicle door a high dimensional and configurational stability and prevents an extensive shrinkage of the outer wall during manufacturing and substantially precludes thermal expansion and/or shrinkage during temperature fluctuations.

Preferably, the rigidifying reinforcing member 4 is manufactured from a steel or aluminum material; however, it is also possible to manufacture the reinforcing member 4 from a fiber-reinforced material such as, for example, thermal setting resins reinforced with glass or carbon fibers.

Preferably, in accordance with the present invention, as shown most clearly in FIG. 2, a reinforcing member consists of an outer tubular frame 41 corresponding to a contour of the door and defining a window opening of the vehicle along three sides. The tubular frame forms or constitutes a closed frame together with the angular head piece 42 as shown most clearly in FIGS. 2 and 2a. An additional stabilizing component is provided in the form of a horizontal restraining strut 45 which defines the lower end of a window opening of the vehicle. As shown in FIG. 2b, a skeleton expander 44 is connected to a door lock support 43. The skeleton expander 44 serves for increasing a bending resistance when a horizontal force is introduced.

The impact protection strut 5, as shown in FIGS. 2, 2a, and 2b extends substantially horizontally and is connected with the door lock support 43 and, by way of the head piece 42, with a hinge system 46.

The impact protection strut 5 is fashioned of two correspondingly profiled steel sheets 51, 52 so as to define a hollow profile; however, it is also possible in accordance with the present invention to utilize corresponding tubular profiles. Since the impact protection strut 5 is in direct contact with an outer periphery of the outer wall 2, the impact protection strut 5 transmits static or dynamic forces acting on the outer door wall 2 directly into the vehicle body by way of points of application of forces such as, for example, hinges and the locks of the vehicle door. With a correspondingly bending-resistant design of the impact protection struts 5, it is possible to absorb considerable forces with a low deformation. Preferably, the impact protection strut 5 is utilized for the formation of visible edges or character lines of an outer contour of the door whereby the zones of collapse due to impact within the outer contour, which are otherwise visible, can be avoided.

An additional diagonal strut 6 is provided in order to increase the bending resistance upon the application of a vertical force. For manufacturing reasons, the diagonal strut 6 is not integrated into the one-piece outer wall of the door of the motor vehicle but is rather attached separately thereto. The diagonal strut, as shown most clearly in FIG. 2, is not surrounded by the synthetic resinous material of the outer wall 2 but connects the upper hinge system 46 with the impact protection strut 5.

As shown in FIGS. 3a–3d, the head piece 42, serving as a hinge support is fashioned as an angular rib-shaped part made of, for example, sheet steel. In addition to the hinge system 46, the outer tubular frame 41, the diagonal strut 6, the restraining strut 45, as well as the impact protection strut 5 are attached to the head piece 42.

As shown in FIGS. 4, 4a, 4b, and 4c, which provides an indication of the outer contours of the inner wall 3 of the door 1, as viewed from the interior of the vehicle, the inner wall 3 is produced as an injection molded part by the RRIM process. In an especially advantageous manner, additional rigidifying struts (FIG. 4c) as well as a decorative surface covering (not shown) can readily be integrated into a single manufacturing step.

The inner wall 3, as shown in FIG. 4b may be connected by mounting elements 34 such as, for example, screws or clips and, consequently, the inner wall 3 enhances or contributes essentially toward the stability of the door 1. In the illustrated embodiment, functional elements such as, for example, an arm rest 35 (FIG. 4, 4a) elbow rest 32 (FIG. 4c) door opener 36 (FIG. 4) and door storage compartment 33 (FIGS. 4, 4a, 4b) are molded into the inner wall. The door storage compartment 33 is bounded on the outside by the synthetic resin material 21 (FIG. 4c, 4b) of the outer wall 2 so that an optimum utilization of the body of the door is realized.

A window pane 7 (FIG. 4c) can be disposed in the door of the motor vehicle, with the window pane being constructed so as to be raisable and lowerable and, for this purpose, appropriate guide strips and a guide drive mechanism (not shown) may be attached to the inner wall or to the outer wall 2. Preferably, corresponding mounting struts (not shown) can be injection molded as integral components of the inner or outer wall.

In the illustrated embodiment, the lowering level is limited by, as shown in FIG. 4b, a horizontally extending web 22 of the outer wall 2. The web 22 subdivides the door space into an upper door space and a lower door space, with the lower door space forming the door storage compartment 33. The elbow rest, as shown most clearly in FIG. 4a covers portions of the window pane 7 which still may be visible in a lowered condition of the window pane 7.

As shown in FIG. 4a, a mounting lip 23 is provide for a continuously extending door gasket 8 (FIG. 4b) which is arranged at the outer wall 2 and the mounting lip 23 is shaped as a flange. An integration of the door gasket sealing the external door joint is of extreme advantage in the door of the present invention since, adding a corresponding mounting lip by injection molding requires only an extremely small expenditure.

Figure 5:
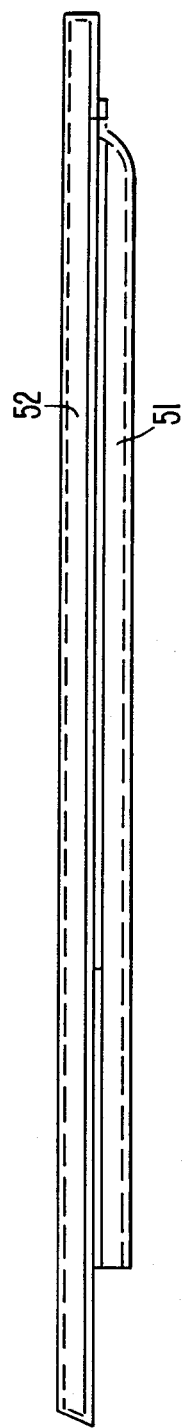
FIG. 5 is a plan view of an impact protection strut constructed in accordance with the present invention.
Figure 5A:
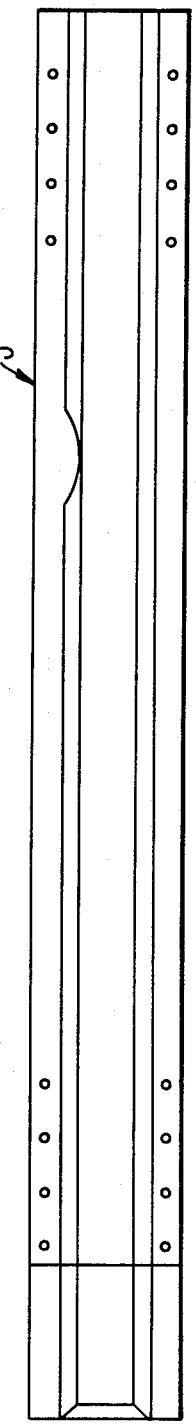
FIG. 5a is a plan view of the impact protection strut of FIG. 5.
Figure 5B:
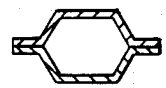
FIG. 5b is a cross-sectional view of the impact protection strut of FIG. 5.

As shown in FIGS. 5, 5a, and 5b, an impact protection strut 5 includes two press molded metal sheets 51, 52.

The vehicle door of the present invention described hereinabove combines the advantages of a conventional vehicle door of sheet steel, namely, high rigidity, extensive freedom from twisting, warping, and providing high safety, with the advantages of a synthetic resin structure, namely, low rate, unrestricted designing possibilities, and flexible surface coverage. Moreover, the synthetic resin door of the present invention can also be painted without any particular problems and, optionally, in one operating step together with the production of the outer wall and/or inner wall in a mold coating.

Furthermore, during the assembly of the outer door wall and the inner door wall in accordance with the subject matter of the present invention, the inner door wall is preferably attached to the synthetic resin beads of the outer door wall surrounding the reinforcing member. For this purpose, a corresponding contact surface can advantageously be provided on the outer door wall. If desired, the inner wall can be glued to the outer wall.

While I have shown and described only one embodiment in accordance with the present invention, it is understood that the same is not limited thereto but is susceptible to numerous changes and modifications as known to one of ordinary skill in the art and I therefore do not wish to be limited to the details shown and described herein but intend to cover all modifications as encompassed by the scope of the appended claims.

I claim:

1. A door for a vehicle, the door comprising an outer wall, an inner wall disposed at a distance from the outer wall, at least one of said outer wall and inner wall consisting essentially of a synthetic resin material, a rigidifying reinforcing means embedded in the outer wall and connected with at least one of a hinge means and hinge support means and at least one of a door lock means and a door lock support means, an impact protection strut means extending substantially horizontally of the door and connected to the door lock support means and hinge means, the rigidifying reinforcing means is formed as a closed frame corresponding to a contour of the door, said closed frame is embedded in the synthetic resin material and enveloped thereby, and the impact protection strut means is in direct contact with an outer periphery of the outer wall for transmitting static or dynamic forces acting on the outer wall directly into the vehicle body.

2. A vehicle door according to claim 1, wherein at least one of the rigidifying reinforcing means and the impact protection strut means consists essentially of steel.

3. A vehicle door according to one of claims 1 or 2, wherein the rigidifying reinforcing means includes at least one outer tubular frame means, the door lock support means, and a head piece means for forming at least a portion of the hinge support means.

4. A vehicle door according to claim 3, wherein the head piece means includes a profiled angle means for anchoring a plate for the hinge support means, the outer tubular frame means, and the impact protection strut means.

5. A vehicle door according to claim 3, further comprising an additional diagonally extending strut means, connecting means for connecting the diagonal strut means to the head piece means and to the impact protection strut means.

6. A vehicle door according to claim 5, wherein the rigidifying reinforcing means and the impact protection strut means are formed as an integral part of the outer wall.

7. A vehicle door according to claim 6, wherein the outer wall includes a web means disposed at a level of the impact protection strut means, a further web means extends in a direction of an interior of the vehicle for defining a lower door space including a door storage compartment.

8. A vehicle door according to claim 7, wherein the door storage compartment is defined toward an outside thereof by the outer wall and toward an inside by the inner wall.

9. A vehicle door according to claim 8, wherein the outer wall is formed by a glass-fiber-reinforced polyurethane hardening in a thermo set through reinforced reaction injection molding, and wherein the rigidifying reinforcing means and the impact strut means are integrated in the outer wall as insert members.

10. A vehicle door according to claim 9, wherein the inner wall is an injection molded glass-fiber-reinforced polyurethane hardened in a thermo set by reinforced reaction injection molding, and wherein a decorative surface paneling is inserted into an injection mold.

11. A vehicle door according to claim 3, wherein the rigidifying reinforcing means includes a substantially horizontally extending restraining strut means connected to the outer tubular frame in such a manner that a window opening of the vehicle door is entirely encompassed by the outer tubular frame.

12. A vehicle door according to claim 11, wherein the synthetic resin material of at least one of the outer wall and the inner wall surrounds the outer tubular frame and the restraining strut means as a bead, with said bead forming, in an area of a boundary of the window opening, an outer contour and inner contour of the vehicle door.

13. A vehicle door according to claim 12, wherein at least one of the outer wall and the inner wall of the vehicle terminates at a lower boundary line of the window opening.

14. A vehicle door according to claim 1, wherein the rigidifying reinforcing means and the impact protection strut means are an integral part of the outer wall means.

15. A vehicle door according to claim 1, wherein the outer wall includes a web means disposed at a level of the impact protection strut means, a further web means extends in a direction of an interior of the vehicle for defining a lower door space including a door storage compartment.

16. A vehicle door according to claim 1, wherein a door storage compartment is provided, said door storage compartment being defined toward an outside by the outer wall and toward an inside by the inner wall.

17. A vehicle door according to claim 1, wherein the outer wall is formed by a glass-fiber-reinforced polyurethane hardening in a thermo set through reinforced reaction injection molding, and wherein the reinforcing means and the impact protection strut means are integrated in the outer wall as insert members.

18. A vehicle door according to claim 1, wherein the inner wall is an injection molded glass-fiber-reinforced polyurethane hardened in a thermo set by reinforced reaction injection molding, and wherein a decorative surface paneling is inserted into an injection mold.

19. A vehicle door according to claim 1, wherein the rigidifying reinforcing means includes a substantially horizontally extending restraining strut means connected to an outer tubular frame member in such a manner that a window opening is entirely encompassed by the outer tubular frame member.

20. A vehicle door according to claim 1, wherein the synthetic resin material of at least one of the outer wall and the inner wall surrounds an outer tubular frame member and a restraining strut means as a bead, with said bead forming, in an area of a boundary of a window opening, an outer contour and inner contour of the vehicle door.

21. A vehicle door according to claim 1, wherein at least one of the outer wall and the inner wall of the vehicle door terminates at a lower boundary line of an opening of a window of the vehicle door.

* * * * *